United States Patent [19]

Nishino

[11] Patent Number: 4,831,648

[45] Date of Patent: May 16, 1989

[54] METHOD OF CONFIRMING USER IN MODEM COMMUNICATIONS AND ITS SYSTEM

[75] Inventor: Hiroshi Nishino, Tokyo, Japan

[73] Assignee: Kabushiki Kaisha Myukomu, Hokkaido, Japan

[21] Appl. No.: 38,393

[22] Filed: Apr. 15, 1987

[30] Foreign Application Priority Data

Apr. 17, 1986 [JP] Japan .................................. 61-89123
Oct. 14, 1986 [JP] Japan ................................ 61-242144

[51] Int. Cl.$^4$ ........................................... H04M 11/00
[52] U.S. Cl. ...................................................... 379/95
[58] Field of Search ..................... 379/93, 95; 364/900

[56] References Cited

U.S. PATENT DOCUMENTS

| | | | |
|---|---|---|---|
| 4,430,728 | 2/1984 | Beitel et al. ............................ | 379/95 |
| 4,520,233 | 5/1985 | Smith .................... | 379/95 |
| 4,531,023 | 7/1985 | Levine .................................. | 379/95 |
| 4,626,623 | 12/1986 | La Haye ............................... | 379/95 |
| 4,679,226 | 7/1987 | Muehleisen .......................... | 379/95 |
| 4,685,124 | 8/1987 | Smitt et al. ............................ | 379/95 |

OTHER PUBLICATIONS

"Securing Dial-Up Networks", Jim Holmes, Telecommunications, Mar. 1984, pp. 84 and 124.

"Password Security Equipment", Glasgal Communications, Inc., Summer Catalog, 1985, pp. 68–72.

"ITT Security Modem", Telecommunications, Apr. 1986, p. 106.

Primary Examiner—Gerald L. Brigance
Assistant Examiner—Richard Hjerpe
Attorney, Agent, or Firm—Jordan and Hamburg

[57] ABSTRACT

The present invention offers a method and system for checking the legality of a user who is subscribed in a telephone system, for example. When a user wants to access an information system operated by the host computer of said telephone system, e.g., a data-base, the legality of the user, whether he is really a person who is registered in the host side, is checked in the host side before a line is established between the user and the host computer.

In detail, the host side modem first checks the user who is then checked by the host side modem and the processing unit of the host side computer. Thereafter, mutual communications, between the user and the computer, are allowed.

The system, based on the invention, comprises a host side modem connectable to the processing unit of the host computer, and a user side modem connectable to said host side modem. Said host side modem can check user while said processing unit being capable to check user through the interaction with the host side modem.

7 Claims, 6 Drawing Sheets

METHOD OF CONFIRMING USER IN MODEM COMMUNICATIONS AND ITS SYSTEM

FIELD OF THE INVENTION AND RELATED ART STATEMENT

This invention relates to a method for checking that a user of modem communications that is attempting to access a database is legally entitled to do so.

The procedure for commonly using a database, for example, is carried out as follows. The host computer in the database center is connected to each user's computer through modem and telephone line. Permission for using the database is given after checking user code and password, previously registered in the center. Use of the database is charged based on the procedure above.

In such a system where the use of the database is checked by user code and password only, illegal use of the system cannot be prevented when a person, aware of the password, etc. by any means, obtains illegal access. To protect the system from such unauthorized use, a call-back system is proposed in the U.S.A. According to this system, the center side checks the user code and password and then the telephone line is disconnected. After that, the center calls the user and checks if receiving is enabled.

However, illegal use may still occur with this system because the illegal user can be connected to the host computer if such user receives the call from the center. Therefore, the proposed method is not completely satisfactory for checking the user's identity.

OBJECTS AND SUMMARY OF THE INVENTION

One objective of the present invention is to identify an authorized user.

A first method is described as follows. A line is connected between the host side modem and the user side modem, while the host side modem checks a user. After completion of checking, the host side modem connects the line in the processing unit. The host side modem and the processing unit cooperate to check the user again. When this checking is completed, the user is connected to the host establishing communications between them.

There is another method as described in the following discussion. When a user (sending or calling side) applies to use a database, etc. to the host (receiving or response side) through wired or wireless line 3 while completing a connection (first connection), a user number is thus set in the host side modem 2 (number setting). Host side modem 2 stores the set number in memory unit 6. After completion of setting, the line is disconnected (cutoff 2).

The user is then called from the host side and, when line 3 is connected (second connection), host side modem 2 checks user modem 4. After completion of checking, a keyword is sent from host side modem 2 to the user (keyword setting). User side modem 4 stores the keyword in memory unit 7c.

Another call is sent from the user side to the host side (call 3). When the line is connected with line 3 (third connection), host side modem 2 checks the user and, upon completion of checking, the keyword stored in the user side modem is transmitted from the user side to the host side (keyword transmission) by the second connection. This keyword is compared with the keyword set by host side modem 2. Only when both keywords agree, processing unit 1 compares the entered password and the normal password registered in the memory unit 8 in advance. Only when both passwords agree, are communications enabled.

The features of the second method, namely the user check system are as follows. This system is provided with a host side modem connectable to the processing unit and a user side modem connectable to said host side modem. The host side modem checks the user and said processing unit again checks the user who was already checked by the host side modem, in cooperation with the host side modem. In addition, this system is provided with host side modem 2 connected to processing unit 1 and user side modem 4. Both modems 2 and 4 are connectable through wire or wireless line 3. Said user side modem 4 comprises a signal generator 7a, demodulator 7b for receiving a keyword sent from the host side modem and a memory unit 7c. Said host side modem 2 comprises a demodulator 6b for receiving a number setting sent from user side modem 4, set number memory unit 6c, a signal generator 6a and a user check unit that is activated when the second connection is completed. Thereby, this second method can compare keywords. Modem 2 contains a check unit for confirming the user when the third connection is established. Processing unit 1 is provided with a memory unit 8 for storing a legal password together with password comparing function.

Among said first through third calls and said first through second cutoffs, the second cutoff and the third call can be omitted. At that time, a keyword is set from the host side modem to the user side modem, upon the first call. Then said third call is activated upon said second call. In this case, however, the accuracy for checking user, by means of the first and third calls, becomes slightly inferior.

DETAILED DESCRIPTION OF THE INVENTION

An embodiment of the present invention, namely a method for preventing illegal use of a database and its application to a preventive system, is described referring to related drawings.

Figure 1:
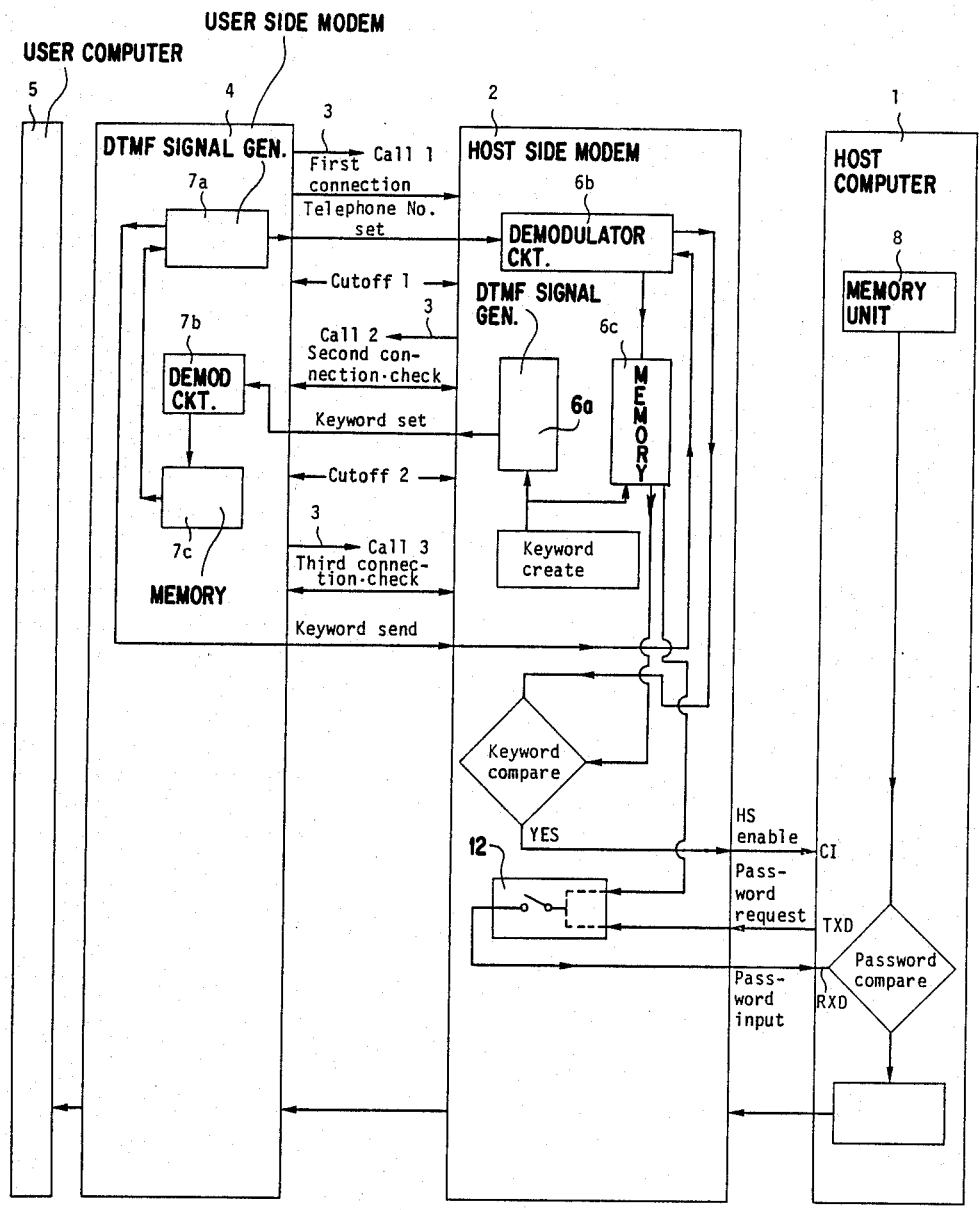
FIG. 1 is a block diagram showing the procedure for connecting a database illegal use preventive system and associated operations.

Referring to FIG. 1, host side modem 2 is connected to host computer 1, the processing unit of the database center. This modem is connectable to user side modem 4 through telephone line 3. User computer 5 can perform computer communications through these modems 4, 2.

Each modem 2 or 4 comprises DTMF signal generators, 6a, 7a, demodulators 6b, 7b and memory circuits 6c, 7c. Modem 2 contains a check unit for examining illegal use of modem 4. In host side modem 2, a switch 12 is provided to cut off the connection with host computer 1, and also, an arithmetic unit is provided to compare keywords. In addition, memory unit 8 of host computer 1 previously registers the telephone number of the database. Thereby, a password, entered occasionally from an external user, can be compared.

Figure 2:
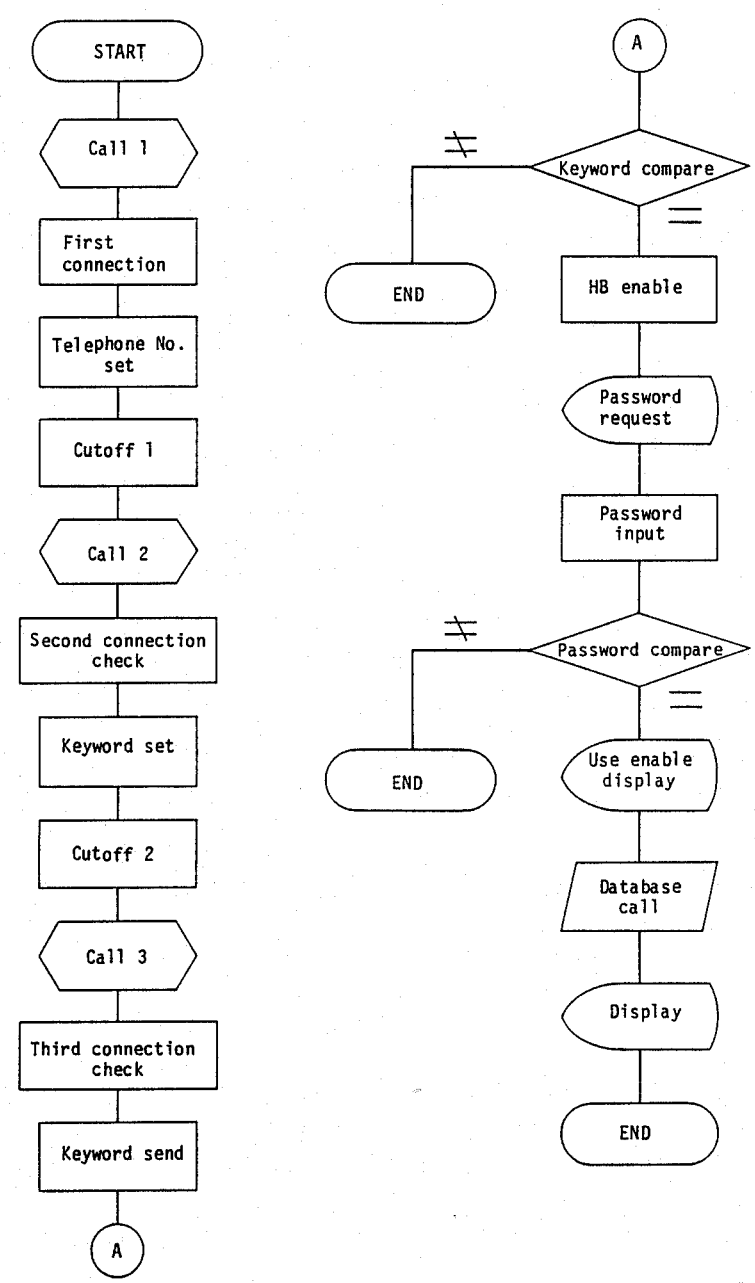
FIG. 2 is a flow chart.

Next, application to the present invention and its system operation are described with an example where only one host side modem 2 is connected to host computer 1 as shown in FIGS. 1 and 2. In this system, switch 12 in host side modem 2 is always open, and the connection between this modem and host computer 1 is disconnected.

A user of the database, first calls via telephone (call 1) for applying to the database center through telephone line 3 by means of modem 4. When the lines of both modems 4, 2 are connected (first connection), the user's telephone number (for example *1234567*) is transmitted to host side modem 2 by the DTMF signal from signal generator circuit 7a, while being registered in memory circuit 6c of modem 4 via modem circuit 6b (telephone number setting). After completion of setting the number, the line is disconnected (cutoff 1) from the host side.

"*" is attached to notify a number setting to host side modem 2.

Then host side modem 2 calls the previously set telephone number (call 2) and, when the lines of both modems are connected (second connection), user side modem 4 is checked by the check circuit in host side modem 2 at this stage. Check items, operated in the above, include for example whether the modem used by the user is legal (a modem assigned by the center), communicatable or not and, even if communicatable, whether the call is a transfer call or not. Normality of the modem is checked by the type of response signal when connected by the DTMF signal, response time and timing. With a normal modem, the keyword based on the DTMF signal is sent from host side modem 2 to user modem 4 by signal generator circuit 6a (keyword setting) provided that the number of calling signal rings is within specified limit and the user immediately replies after completion of connection. User modem 4, in the receiving side, demodulates the keyword by DTMF signal demodulator circuit 7b and stores it in memory circuit 7c. After receiving, the line is disconnected (cutoff 2).

In continuation, the user side telephone calls again (call 3), thereby the line between modems 2, 4 is connected (third connection). At this stage of connection, the host side sends a signal to the user side modem by using a check circuit built in host side modem 2, for checking the result of the response signal to confirm the user. After completion of confirming, the keyword stored from modem 4 in host side modem 2 through the second connection (for example, #102468#) is sent by the DTMF signal from circuit 7a (keyword transmission).

"#" is attached to notify keyword returning, to host side modem 2.

Host side modem 2 demodulates the keyword sent from the user side by means of circuit 6b and compares this with the keyword sent previously in setting the keyword (keyword compare). With both keywords agreed, the host computer is activated (H.S enable) through CI terminal of the interface (RS232C) of host computer 1. In addition, there are other methods available, not based on the CI signal.

Host computer 1 immediately enquires the password from host side modem 2, through the TXD terminal of RS232C (password request).

Host side modem 2, on the other hand, closes switch 12 (FIG. 1) and sends a password (user's telephone number) previously registered by the first connection, to the host computer regardless of user side. This password is entered in host computer 1 from terminal RXD of RS232C. Then host computer 1 compares this password with the user's telephone number regularly registered in memory unit 8 in advance (password compare) and, only when both agree, activates the status of use for the database. The user can now use the preferred database.

Check functions for the foregoing system are described in the following.

The first check is that, after completion of setting a number, line 3 is cut off while calling the user from host side modem 2. Thus, the line between the modems is not connected to an illegal user.

According to the second check, legality of the user is checked by the check circuit of host side modem 2 when the second connection is completed.

The third check is that a keyword is set from host side modem 2 to user side modem 4 while dealing with the number in the first connection as a tenative one, instead of the final.

In the fourth check, legality of the user is confirmed by issuing a response signal from host side modem 2 to user side modem 4 at the stage of the third connection.

The fifth check is done referring to the time delay of sending the keyword from the user side to host side modem 2, etc.

The sixth check is to compare keywords in host side modem 2. The set number in the first connection is only tentative, while the real keyword is sent from the host side modem. By comparing these keywords, the check function can be enhanced.

The seventh check is a comparison of the password. Where an illegal user employs a modem assigned by the center in advance, the user cannot be checked in the first through sixth checks. According to the seventh check, passwords do not agree unless the telephone number in the user side is used, thereby preventing illegal uses entirely.

In the foregoing example, the description is given assuming a modem in the host side. In fact, a number of modems are used for communications with database, etc.

Now, another case, with a number of modems connected to host computer 1, is described in the following.

At this time, normally one telephone number is used in the host side center, while distributing to several modems through an exchange. In addition, the connection between modems 2, 4 is temporarily cut off. Therefore, it does not always occur that the user is connected to the same modem in the first and third connections, as modem 2. When each modem originally generates a keyword, the same keyword may possibly be used by a couple of modems, disabling keyword comparison.

Figure 3:
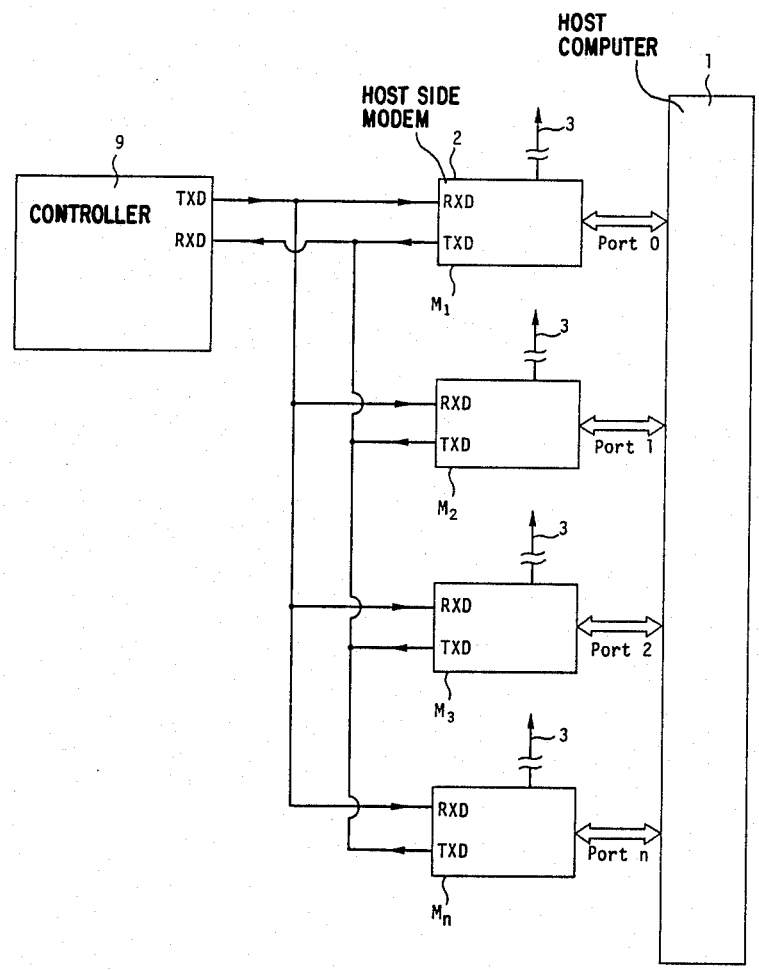
FIG. 3 describes a system where a number of modems are connected to a host computer.

According to the present invention, an external controller 9 is connected to each modem 2 in the host side (M1, M2, M3,—Mn), as shown in FIG. 3, for communications and controls between each modem. This controller is connected parallel to each modem.

The functions of controller 9 include instruction for send request timing to each modem, generation of keyword, storing of telephone number accepted by each modem and keyword and their transmission/receiving. Transmission/receiving, between controller 9 an each modem, is enabled using serial data. TXD and RXD, for communications between controller 9 and modems, can be commonly used by selecting line TXD and RXD of RS232C.

Various types of data transmitting/receiving formats can be used. An example is described as follows assuming a configuration of FIG. 4, for the detailed operations of modem and controller.

First, operations in the modem side are mainly described.

Each modem 2 (M1, M2, M3—Mn) stores its own modem number to discriminate an arriving request. The modem can recognize this modem number by means of a builtin DIP switch, etc. When the modem is used singly, the DIP switch is to be set to 0. With N modems simultaneously are in use, the switch of each modem is to be set to 1, 2, 3,—N.

Figure 4:
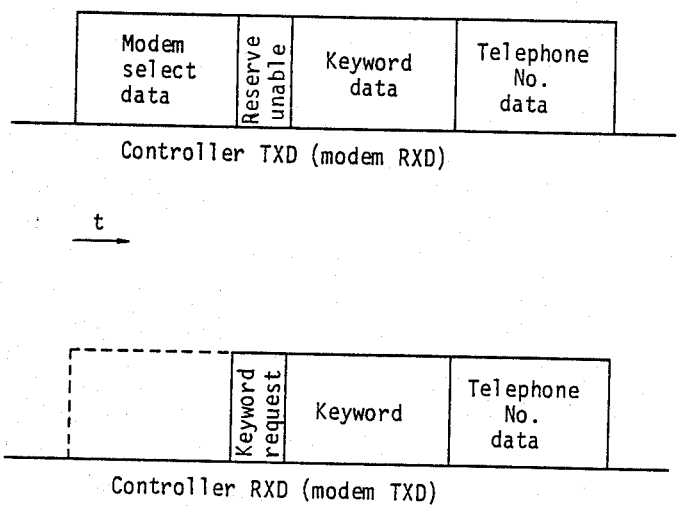
FIG. 4 indicates the example of a control signal format with several modems connected.

When a telephone number (*1234567*) is sent from the user to host side modem 2 at the first connection shown in FIG. 1, host side modems 1—N, connected for the first connection, demodulate the set number based on the DTMF signal and store it in memory unit 6 in the modems. At that time, if N reserve numbers are already stored in controller 9 as shown in FIG. 4, a reserve unable signal is sent from the controller side, while rejecting the reserve.

In the reserve receivable state, the modem cuts off telephone line 3 (cutoff 1) and, when modem select data 1—N, always sent from controller 9, agrees with its own modem number, a keyword request signal is generated to the controller while receiving a keyword from the controller. Then, the modem calls the set number (telephone number), sent from the user before, for (call 2). With telephone line 3 connected, the keyword is sent to modem 4 in the user side. After the line is disconnected (cutoff 2), modem 2 sends the keyword and the telephone number to controller 9 when the modem select data agrees with the own modem number. The controller stores these as a pair of data.

When the keyword (#102468#) is returned by the third connection, modem 2 receives and stores the telephone number corresponding to the keyword sent from the user based on the DTMF signal, from the controller. At that time, the keyword and the telephone number are always sent from controller 9.

After the above, modem 2 sends the keyword to the controller when modem select data, sent from the controller, agrees with its own value. Thus, the controller erases the keyword and respective telephone number from the memory unit in the controller.

Thereafter, the modem turns ON the CI signal of RS232C and enables host computer 1.

Next, the operation of controller 9 is described. The controller always transmits data in the memory (modem select data, keyword, telephone number) 1—N to the TXD line. When a keyword, sent from the modem, is found in the RXD line, the keyword and respective telephone number are deleted.

The reserve unable signal is sent to the TXD line when the number of keywords stored in the controller becomes the same as the number of modems, namely N.

The controller creates a keyword according to the request of the modem. However, keywords already used in the memory are not used (generated). When reservation (number setting) is carried out with the same telephone number, the number is stored as a pair of the latest keyword.

The functions required for the foregoing modem and controller can be realized by using the technology known in the state of the art such as one chip microcomputer.

Figure 5:
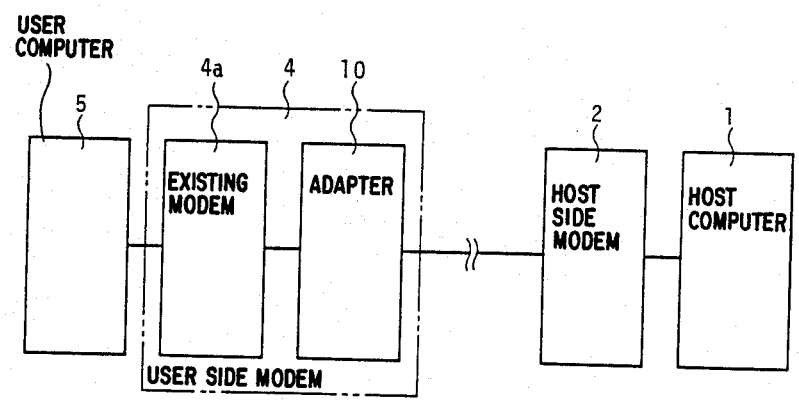
FIG. 5 denotes an example of the system using the adapter.

In the foregoing embodiment of the present invention, the modem used in the user side is assumed to contain DTMF signal generator 7a, demodulator 7b and memory circuit 7c in the modem. However, with a pushphone telephone line in use, DTMF signal can be sent from the buttons of the pushphone. Therefore, an existing modem device can apply only by adding a demodulator circuit in the adapter system, that is used as a modem circuit for the dial line. Consequently, no modification is required in the host computer program, thereby easily connectable to an existing modem communication system. Referring to FIG. 5, existing modem 4a and adapter 10 become the user side modem 4 at that time. This adapter 10 is provided with a signal generator 7a, demodulator 7b and memory circuit 7c.

It is also possible to carry out numer setting, keyword transmission and return directly by modem communications instead of DTMF signal. However, it is more preferable to use DTMF in view of limiting users.

With the foregoing embodiment, host side modem 2 also checks the user in the third connection as well as the second one. In addition, the modem confirms the keyword when it is transmitted from the user side to the host side modem. Therefore, the safety of communication can be further enhanced.

Furthermore, the controller is connected parallel to each modem, which allows to greatly increase the number of registered users than a conventional callback system.

The present invention can also apply to the automatic answering telephone system because access to telephone content stored in the telephone set requires the confirmation for the particular user.

Figure 6:
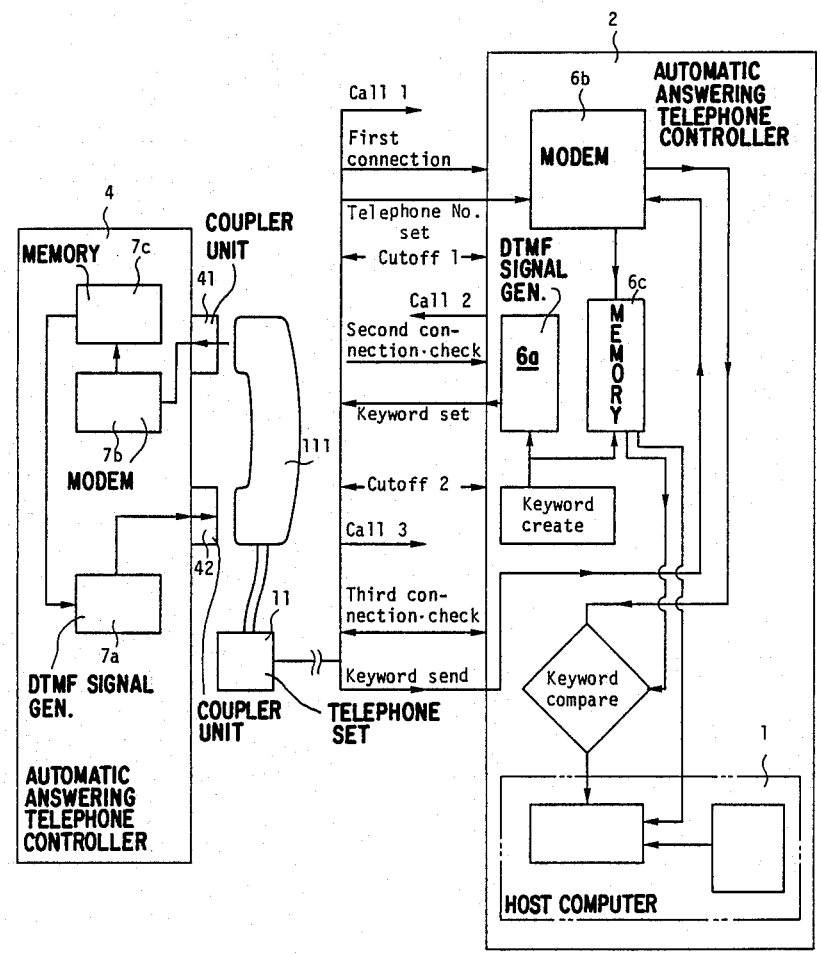
FIG. 6 is a block diagram showing the procedure for connecting an exemplary system applied to the automatic answering telephone system together with related operations.

Another embodiment of the present invention, to be described in the following referring to FIG. 6, relates to the automatic answering telephone system.

This embodiment contains a processing unit 1 in automatic answering telephone set 2, that can compare passwords. Receiver 111 of telephone set 11 can be connected to receiving coupler unit 41 of automatic answering telephone controller 4 and sending coupler unit 42. Other components and configurations are substantially the same as the foregoing embodiment, while being illustrated with identical symbols for corresponding elements.

The present invention can also apply to other systems including the home automation system where external control can activate bath water heating and key locking, home banking system, Computer stop exchange, and a security system.

Where the present invention applies to the home automation system, host side modem 2 and processing unit 1 are built in the home telephone set. Or an adapter, containing these devices, is connected to the telephone set, while the user carries portable modem 4 which is connected to an external telephone set for use. Thereby, the home telephone set can completey check the user himself. Therefore, error operation for the home automation system, caused by illegal instruction, can be prevented completely ensuring absolute safety.

EFFECTS OF THE INVENTION

According to the present invention as described above, legality of the user can be completely confirmed. Accordingly, where the present invention applies to the illegal use preventative system for database for example, better preventing effect is assured than conventional callback system. Both database center and user can maintain safe communications. In addition, higher safety is ensured with, for example, the home automation system.

I claim:

1. A method of checking the authorization of a user in modem communications and providing a connection between a user and a host side processing unit when the authorization has been satisfactorily checked, comprising the steps of:
   disconnecting a host side processing unit having authorized user telephone numbers previously stored therein from a host side modem;
   setting a user telephone number in the host side modem from a user side modem;
   performing a first user confirmation operation by comparing a keyword received by the host side modem from the user side modem with the telephone number set in the host side modem after a telephone call and a keyword transmission/receiving operation from the host side modem to the user side modem have been completed;
   connecting said host side processing unit with said host side modem only after said first user confirmation operation has been satisfactorily completed;
   performing a final user confirmation operation after successful completion of said first user confirmation operation and while there is no communications between the user and the processing unit, at the request of the processing unit, by comparing the telephone number set in the host side modem and said previously set telephone numbers in said host side processing unit; and
   permitting communications between the user and the processing unit after said final user confirmation operation has been satisfactorily completed.

2. A method according to claim 1 further, prior to said step of performing a first user confirmation and after said step of setting, including the steps of:
   connecting said user side modem and said host side modem in response to a telephone call from the user side modem to said host side modem;
   setting a user telephone number in the host side modem by the user after said host side modem has been connected with said user side modem; and
   disconnecting said user side modem from said host side modem; and
   wherein said step of performing a first user confirmation includes the steps of:
   connecting said user side modem and said host side modem a second time in response to a telephone call from said host side modem to the user side modem;
   checking authorization of the user side modem in the host side modem after said user side modem has been connected with said host side modem a second time;
   transmitting a keyword from said host side modem to said user side modem after authorization of the user has been checked and confirmed;
   disconnecting said user side modem from said host side modem a second time;
   connecting said user side modem and said host side modem a third time in response to the user side modem;
   transmitting the keyword from said user side modem to said host side modem; and
   comparing said transmitted keyword from said user side modem with the set telephone number in said host side modem.

3. A method according to claim 1 further comprising the steps of:
   operating a first user check means by the host side modem when said user side modem and said host side modem have been connected a third time; and
   operating a second user check means by the host side modem when said keyword has been transmitted by said user side modem and after confirmation by said first user check means has been satisfactorily completed.

4. A user check system for modem communications, comprising:
   a host side modem including first user confirmation means; a host side processing unit connectable to said host side modem, said processing unit including second user confirmation means;
   a user side modem connectable to said host side modem;
   switch means for selectively connecting and disconnecting said host side modem from said processing unit;
   said user side modem includes a first signal generator, first demodulating means for receiving a keyword sent from the host side modem, and a memory unit;
   said host side modem includes second demodulating means for receiving a set telephone number from the user side modem and a set telephone number memory, a second signal generator and check means for confirming authorization of a user when the host side modem is connected with said user side modem by performing a keyword comparing operation;
   said processing unit includes a password memory unit and password comparing means for comparing the set telephone number in said host side modem with previously stored telephone numbers stored in said password memory unit;
   said first user confirmation means performing a first user confirmation operation by comparing a keyword received by the host side modem from the user side modem with the telephone number set in the host side modem after a telephone call and a keyword transmission/receiving operation from the host side modem to the user side modem have been completed; and
   said second user confirmation means performing a final user confirmation operation after successful completion of said first user confirmation operation and while said host side processing unit is not connected with the user, at the request of the processing unit, by comparing the telephone number set in the host side modem and said previously stored telephone numbers in said host processing unit.

5. Apparatus for checking the authorization of a user in modem communications and providing a connection between a user and a host side processing unit when the authorization has been satisfactorily checked, comprising:

switch means for connecting a host side processing unit having authorized previously stored user telephone numbers therein with a host side modem;

means for opening said switch means to disconnect said host side processing unit from said host side modem at the beginning of a user confirmation operation;

telephone number setting means in the host side modem for storing a telephone number from a user side modem;

first user confirmation means for performing a first user confirmation operation by comparing a keyword received by the host side modem from the user side modem with the telephone number set in the host side modem after a telephone call and a keyword transmission/receiving operation from the host side modem to the user side modem have been completed;

means for closing said switch means after said first user confirmation operation has been successfully completed to connect said processing unit with said host side modem and for preventing communications between said host side processing unit and the user;

second user confirmation means for performing a final user confirmation operation after successful completion of said first user confirmation operation and while said host side processing unit is not connected with the user, at the request of the processing unit, by comparing the telephone number set in the host side modem and said previously stored telephone numbers in said host processing unit; and means for permitting communications between the user and the processing unit after said final user confirmation operation has been satisfactorily completed.

6. Apparatus according to claim 5 further comprising:

connection means for connecting said user side modem and said host side modem in response to a telephone call from the user side modem to said host side modem;

user telephone number setting means for setting a user telephone number in the host side modem by the user after said host side modem has been connected with said user side modem; and means for disconnecting said user side modem from said host side modem; and wherein said first user confirmation means comprises:

connection means for connecting said user side modem and said host side modem a second time in response to a telephone call from said host side modem to the user side modem;

user check means for checking authorization of the user side modem in the host side modem after said user side modem has been connected with said host side modem a second time;

means for transmitting a keyword from said host side modem to said user side modem after authorization of the user has been checked and confirmed;

means for disconnecting said user side modem from said host side modem a second time;

means for connecting said user side modem and said host side modem a third time in response to the user side modem;

means for transmitting the keyword from said user side modem to said host side modem; and means for comparing said transmitted keyword from said user side modem with the set telephone number in said host side modem.

7. Apparatus according to claim 6 further comprising first user check means operated by the host side modem when said user side modem and said host side modem have been connected a third time for performing a confirmation operation; and said means for comparing includes second user check means operated by the host side modem when said keyword has been transmitted by said user side modem and after confirmation by said first user check means has been satisfactorily completed for performing said comparing operation.

* * * * *